US010077118B2

(12) United States Patent
Bortoli et al.

(10) Patent No.: US 10,077,118 B2
(45) Date of Patent: Sep. 18, 2018

(54) INTEGRAL RAT GENERATOR COOLING HOLES

(71) Applicant: HAMILTON SUNDSTRAND CORPORATION, Charlotte, NC (US)

(72) Inventors: Stephen Michael Bortoli, Roscoe, IL (US); David Everett Russ, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 61 days.

(21) Appl. No.: 15/174,479

(22) Filed: Jun. 6, 2016

(65) Prior Publication Data
US 2017/0349294 A1 Dec. 7, 2017

(51) Int. Cl.
*F01D 15/10* (2006.01)
*F02C 6/00* (2006.01)
*H02K 7/18* (2006.01)
*H02P 9/04* (2006.01)
*B64D 41/00* (2006.01)
*H02K 5/20* (2006.01)
*H02K 9/02* (2006.01)
*H02K 15/14* (2006.01)
*F02B 63/04* (2006.01)

(52) U.S. Cl.
CPC ............ *B64D 41/007* (2013.01); *H02K 5/20* (2013.01); *H02K 7/183* (2013.01); *H02K 7/1823* (2013.01); *H02K 9/02* (2013.01); *H02K 15/14* (2013.01); *H02K 2213/03* (2013.01)

(58) Field of Classification Search
USPC .................. 290/1 A, 52; 244/58; 415/35
See application file for complete search history.

(56) References Cited

U.S. PATENT DOCUMENTS

| 3,635,584 A | * | 1/1972 | Chilman | F01D 7/02 416/157 A |
| 4,128,769 A | * | 12/1978 | Bons | F01D 25/30 181/213 |
| 4,534,118 A | * | 8/1985 | Cabus | F26B 3/04 34/514 |
| 4,747,467 A | * | 5/1988 | Lyon | F01D 25/30 181/218 |

(Continued)

*Primary Examiner* — Pedro J Cuevas
(74) *Attorney, Agent, or Firm* — Cantor Colburn LLP (57) ABSTRACT

A ram air turbine having: a strut assembly having an outer housing enclosing a first inner chamber; a generator housing operatively connected to the strut assembly, the generator housing having an outer surface enclosing a second inner chamber, the second inner chamber being fluidly connected to first inner chamber; a turbine assembly operably connected to the strut assembly, the turbine assembly in operation rotates in freestream air; and a power generation device mechanically connected to the turbine assembly and located within the second inner chamber, the power generation device generates power as turbine assembly rotates. The strut assembly includes a first screen portion having a plurality of inlet holes integrally formed in the outer housing. The generator housing includes a second screen portion having a plurality of outlet holes integrally formed in the outer surface. Freestream air passes through inlet holes, over the power generation device, and out outlet holes.

18 Claims, 6 Drawing Sheets

(56) References Cited

U.S. PATENT DOCUMENTS

| | | | | |
|---|---|---|---|---|
| 4,991,796 A * | 2/1991 | Peters | B64D 41/007 244/119 |
| 5,174,719 A * | 12/1992 | Walsh | B64D 41/007 184/6.11 |
| 6,270,309 B1 * | 8/2001 | Ghetzler | B64D 41/007 137/15.1 |
| 6,368,386 B1 * | 4/2002 | Nelson | B01D 46/002 55/324 |
| 6,580,179 B2 * | 6/2003 | Eccles | B64D 41/007 290/44 |
| 6,676,379 B2 * | 1/2004 | Eccles | B64D 41/007 244/58 |
| 6,875,256 B2 * | 4/2005 | Gillingham | B01D 39/1623 55/302 |
| 6,962,057 B2 * | 11/2005 | Kurokawa | F01D 25/24 248/646 |
| 7,077,631 B2 * | 7/2006 | Eccles | B64D 41/007 244/58 |
| 7,514,810 B2 * | 4/2009 | Kern | F01D 15/10 290/52 |
| 7,632,339 B2 * | 12/2009 | Singh | B01D 46/0031 55/428 |
| 8,337,597 B2 * | 12/2012 | Chillar | B01D 45/08 55/428 |
| 8,344,304 B2 * | 1/2013 | Geswender | F02K 7/10 244/3.22 |
| 8,511,096 B1 * | 8/2013 | Haugen | F02K 1/34 181/213 |
| 8,653,688 B2 * | 2/2014 | Justak | B64D 41/007 290/44 |
| 8,864,448 B2 * | 10/2014 | Taneja | B64D 41/007 290/1 B |
| 8,939,725 B2 * | 1/2015 | Lading | B64C 27/18 415/80 |
| 9,132,922 B2 * | 9/2015 | Justak | B64D 41/007 |
| 9,217,417 B2 * | 12/2015 | Taneja | F03D 9/002 |
| 9,725,185 B2 * | 8/2017 | Weber | B64D 41/007 |
| 9,726,149 B2 * | 8/2017 | Bortoli | F03D 9/00 |
| 9,878,800 B2 * | 1/2018 | Russ | B64D 41/007 |
| 2003/0108426 A1 * | 6/2003 | Eccles | B64D 41/007 416/170 R |
| 2005/0129517 A1 * | 6/2005 | Eccles | B64D 41/007 416/170 R |
| 2008/0048456 A1 * | 2/2008 | Browning | H02K 7/1823 290/1 A |
| 2010/0260607 A1 * | 10/2010 | Lading | B64C 27/18 416/20 R |
| 2011/0033280 A1 * | 2/2011 | Justak | B64D 41/007 415/73 |
| 2012/0183402 A1 * | 7/2012 | Bortoli | B64D 41/007 416/170 R |
| 2012/0199001 A1 * | 8/2012 | Chillar | B01D 45/08 95/267 |
| 2012/0299558 A1 * | 11/2012 | Justak | B64D 41/007 322/28 |
| 2012/0301273 A1 * | 11/2012 | Justak | B64D 41/007 415/4.3 |
| 2012/0301290 A1 * | 11/2012 | Justak | B64D 41/007 415/208.2 |
| 2013/0071232 A1 * | 3/2013 | Taneja | B64D 41/007 415/122.1 |
| 2014/0246858 A1 * | 9/2014 | Taneja | F03D 9/002 290/52 |
| 2016/0043606 A1 * | 2/2016 | Chase | H02K 5/10 310/58 |
| 2018/0029722 A1 * | 2/2018 | Marks | B64D 41/007 |

* cited by examiner

INTEGRAL RAT GENERATOR COOLING HOLES

BACKGROUND

The subject matter disclosed herein generally relates to ram air turbine actuators, and more specifically to an apparatus and a method for heat removal from a ram air turbine (RAT) generator.

RATs are commonly used on modern aircraft to provide a secondary and/or emergency power source in the event the primary power source is insufficient or fails. A typical RAT includes a turbine that remains internal to the aircraft until needed. When additional power is required, a door in the aircraft's fuselage will open and the actuator will deploy the RAT's turbine into the freestream air. The turbine is rotated by the freestream air and the rotational power from the turbine is transferred through a drivetrain and converted into electrical power by a power generation device (e.g., an electrical generator). A RAT may also be used to drive a hydraulic pump.

The power generation device may produce excess heat that must be removed from the RAT.

SUMMARY

According to one embodiment, a ram air turbine is provided. The ram air turbine having: a strut assembly having an outer housing enclosing a first inner chamber; a generator housing operatively connected to the strut assembly, the generator housing having an outer surface enclosing a second inner chamber, wherein the second inner chamber is fluidly connected to the first inner chamber; a turbine assembly operably connected to the strut assembly, the turbine assembly in operation rotates in freestream air; and a power generation device mechanically connected to the turbine assembly and located within the second inner chamber, the power generation device in operation generates power as the turbine assembly rotates. The strut assembly includes a first screen portion having a plurality of inlet holes integrally formed in the outer housing. The first screen portion in operation allows the freestream air to enter the outer housing through the plurality of inlet holes and pass over the power generation device. The generator housing includes a second screen portion having a plurality of outlet holes integrally formed in the outer surface. The second screen portion in operation allows the freestream air to exit the generator housing after it has passed over the power generation device.

In addition to one or more of the features described above, or as an alternative, further embodiments of the ram air turbine may include that each of the plurality of inlet holes has a diameter of less than about 0.281 inches (0.714 centimeters).

In addition to one or more of the features described above, or as an alternative, further embodiments of the ram air turbine may include that each of the plurality of outlet holes has a diameter of less than about 0.281 inches (0.714 centimeters).

In addition to one or more of the features described above, or as an alternative, further embodiments of the ram air turbine may include that the plurality of inlet holes are oriented in a staggered hole pattern.

In addition to one or more of the features described above, or as an alternative, further embodiments of the ram air turbine may include that the plurality of outlet holes are oriented in a staggered hole pattern.

In addition to one or more of the features described above, or as an alternative, further embodiments of the ram air turbine may include that the plurality of inlet holes are segmented into three separate groups. The groups being separated from each other by structural load paths of the outer housing.

In addition to one or more of the features described above, or as an alternative, further embodiments of the ram air turbine may include that the plurality of outlet holes are segmented into six separate groups. The groups being separated from each other by structural load paths of the generator housing.

In addition to one or more of the features described above, or as an alternative, further embodiments of the ram air turbine may include that the outer housing at the first screen portion has a variable thickness. The thickness of the outer housing being thinnest at a center point of the first screen portion and increases in thickness circumferentially outward from the center point.

In addition to one or more of the features described above, or as an alternative, further embodiments of the ram air turbine may include that a ratio of an area of the plurality of inlet holes to an area of the first screen portion is less than about 0.6.

According to another embodiment a method of manufacturing a ram air turbine is provided. The method includes the steps of: forming an outer housing of a strut assembly, the outer housing enclosing a first inner chamber; operably connecting a turbine assembly to the strut assembly, the turbine assembly in operation rotates in freestream air; forming a generator housing having an outer surface enclosing a second inner chamber; installing a power generation device into the second inner chamber, the power generation device in operation generates power as the turbine assembly rotates; operably connecting the strut assembly to the generator housing, the second inner chamber being fluidly connected to the first inner chamber; and mechanically connecting the power generation device to the turbine assembly. The strut assembly includes a first screen portion having a plurality of inlet holes integrally formed in the outer housing. The first screen portion in operation allows the freestream air to enter the outer housing through the plurality of inlet holes and pass over the power generation device. The generator housing includes a second screen portion having a plurality of outlet holes integrally formed in the outer surface. The second screen portion in operation allows the freestream air to exit the generator housing after it has passed over the power generation device.

In addition to one or more of the features described above, or as an alternative, further embodiments of the method of manufacturing may include that each of the plurality of inlet holes has a diameter of less than about 0.281 inches (0.714 centimeters).

In addition to one or more of the features described above, or as an alternative, further embodiments of the method of manufacturing may include that each of the plurality of outlet holes has a diameter of less than about 0.281 inches (0.714 centimeters).

In addition to one or more of the features described above, or as an alternative, further embodiments of the method of manufacturing may include that the plurality of inlet holes are oriented in a staggered hole pattern.

In addition to one or more of the features described above, or as an alternative, further embodiments of the method of manufacturing may include that the plurality of outlet holes are oriented in a staggered hole pattern.

In addition to one or more of the features described above, or as an alternative, further embodiments of the method of manufacturing may include that the plurality of inlet holes are segmented into three separate groups, the groups being separated from each other by structural load paths of the outer housing.

In addition to one or more of the features described above, or as an alternative, further embodiments of the method of manufacturing may include that the plurality of outlet holes are segmented into six separate groups, the groups being separated from each other by structural load paths of the generator housing.

In addition to one or more of the features described above, or as an alternative, further embodiments of the method of manufacturing may include that the outer housing at the first screen portion has a variable thickness, the thickness of the outer housing being thinnest at a center point of the first screen portion and increases in thickness circumferentially outward from the center point.

In addition to one or more of the features described above, or as an alternative, further embodiments of the method of manufacturing may include that a ratio of an area of the plurality of inlet holes to an area of the first screen portion is less than about 0.6.

According to another embodiment a method of cooling a power generation device of a ram air turbine is provided. The method having the steps of: allowing freestream air to enter an outer housing of strut assembly through a plurality of inlet holes integrally formed in the outer housing; passing the freestream air over the power generation device within a generator housing, the generator housing being fluidly connected to the outer housing; and allowing the freestream air to exit the generator housing through a plurality of outlet holes integrally formed in an outer surface of the generator housing.

In addition to one or more of the features described above, or as an alternative, further embodiments of the method of cooling a power generation device of a ram air turbine may include that each of the plurality of inlet holes has a diameter of less than about 0.281 inches (0.714 centimeters).

Technical effects of embodiments of the present disclosure include integral screens to allow heat removal from a power generation device of a ram air turbine, while adding additional structural rigidity to prevent structural resonance from occurring at a self-induced frequency and reducing manufacturing cost.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
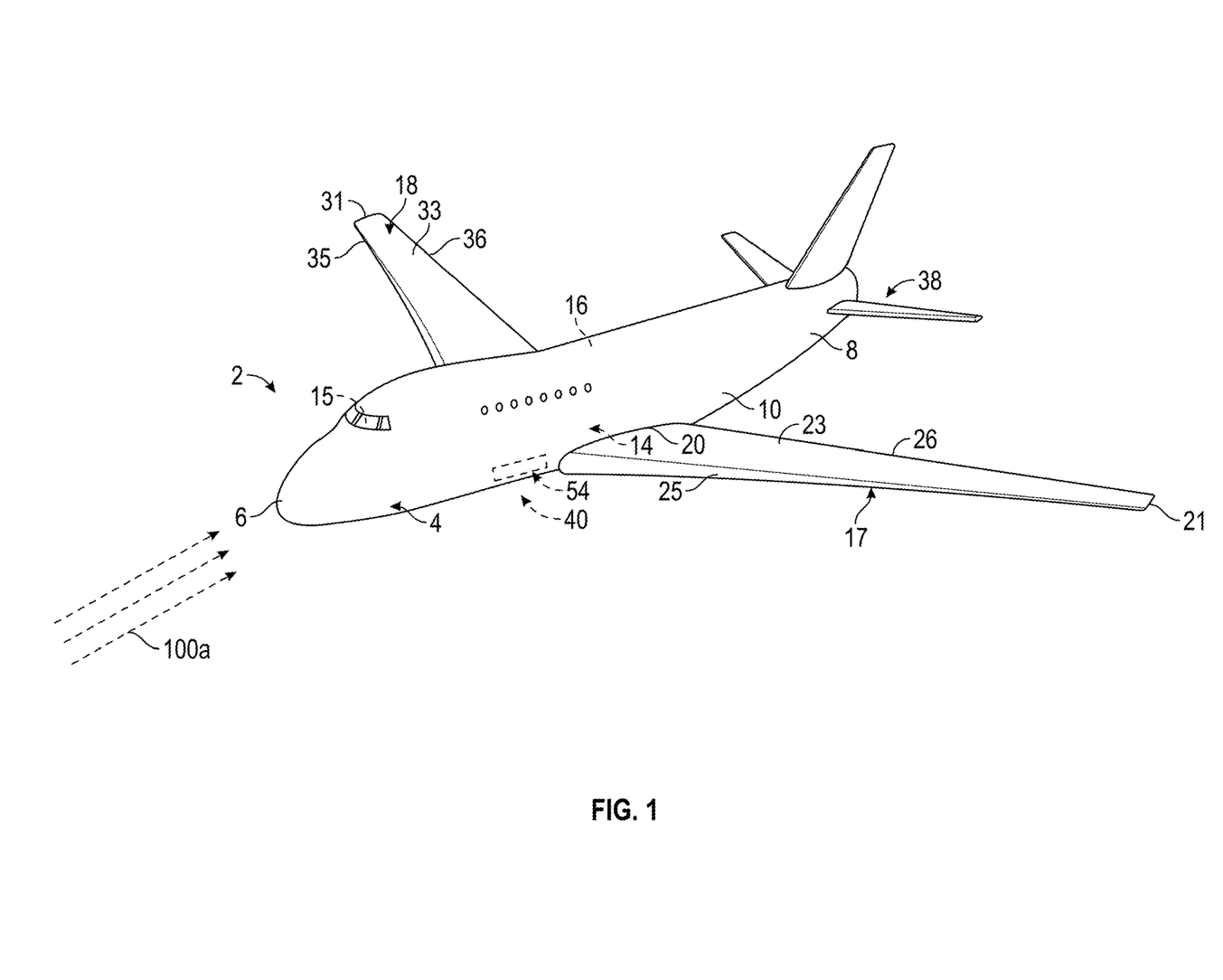
FIG. 1 is a perspective view of an aircraft that may incorporate embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes a ram air turbine (RAT) assembly 40 mounted within fuselage 4, nose portion 6, or wings 17, 18. When additional electrical and/or hydraulic power is required, a compartment door 54 in the aircraft skin will open and an actuator (not shown) will actuate to deploy the RAT assembly 40 into the freestream air 100a.

Figure 2:
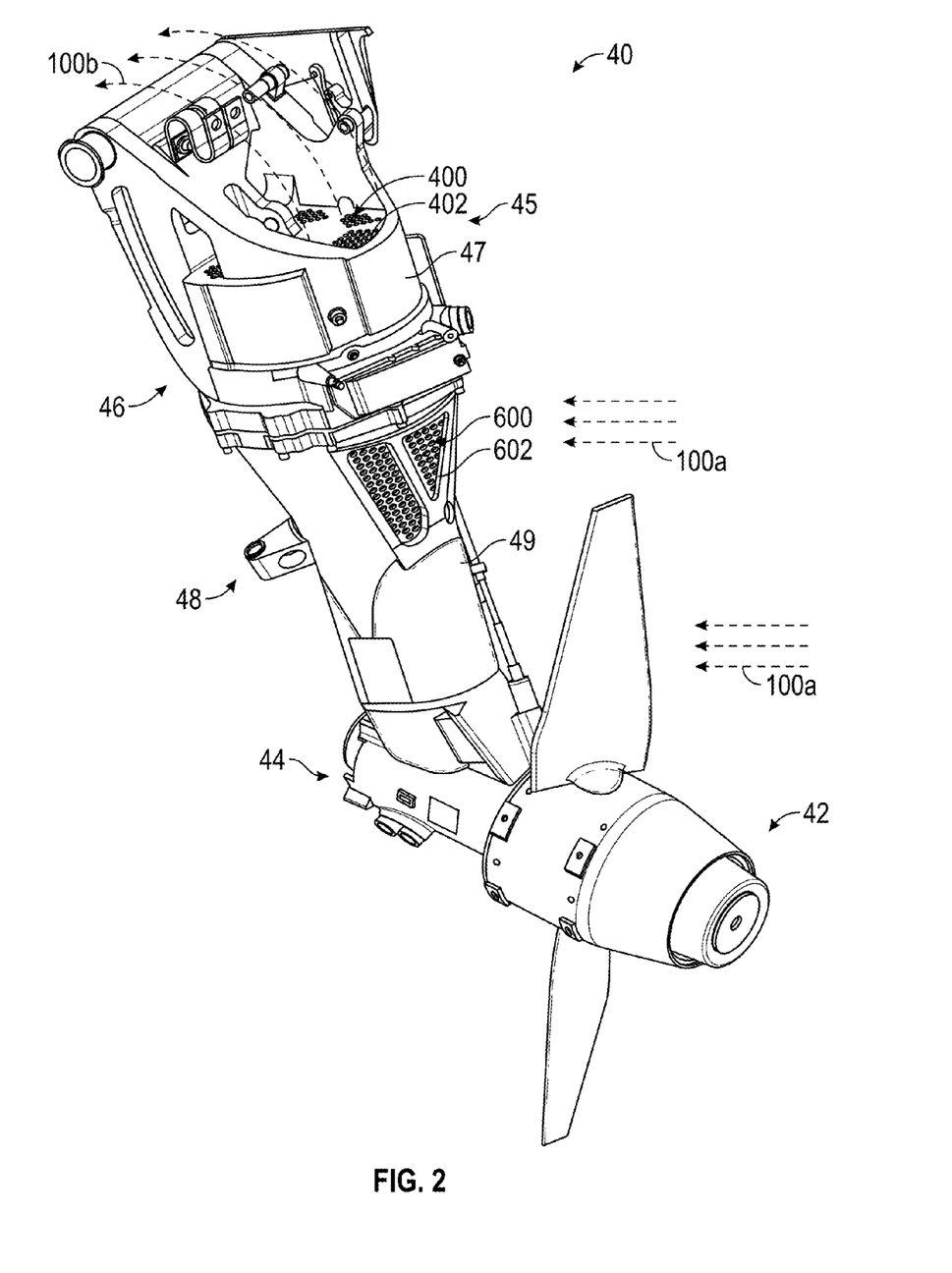
FIG. 2 is a perspective view of ram air turbine (RAT) assembly, according to an embodiment of the present disclosure.
Figure 3:
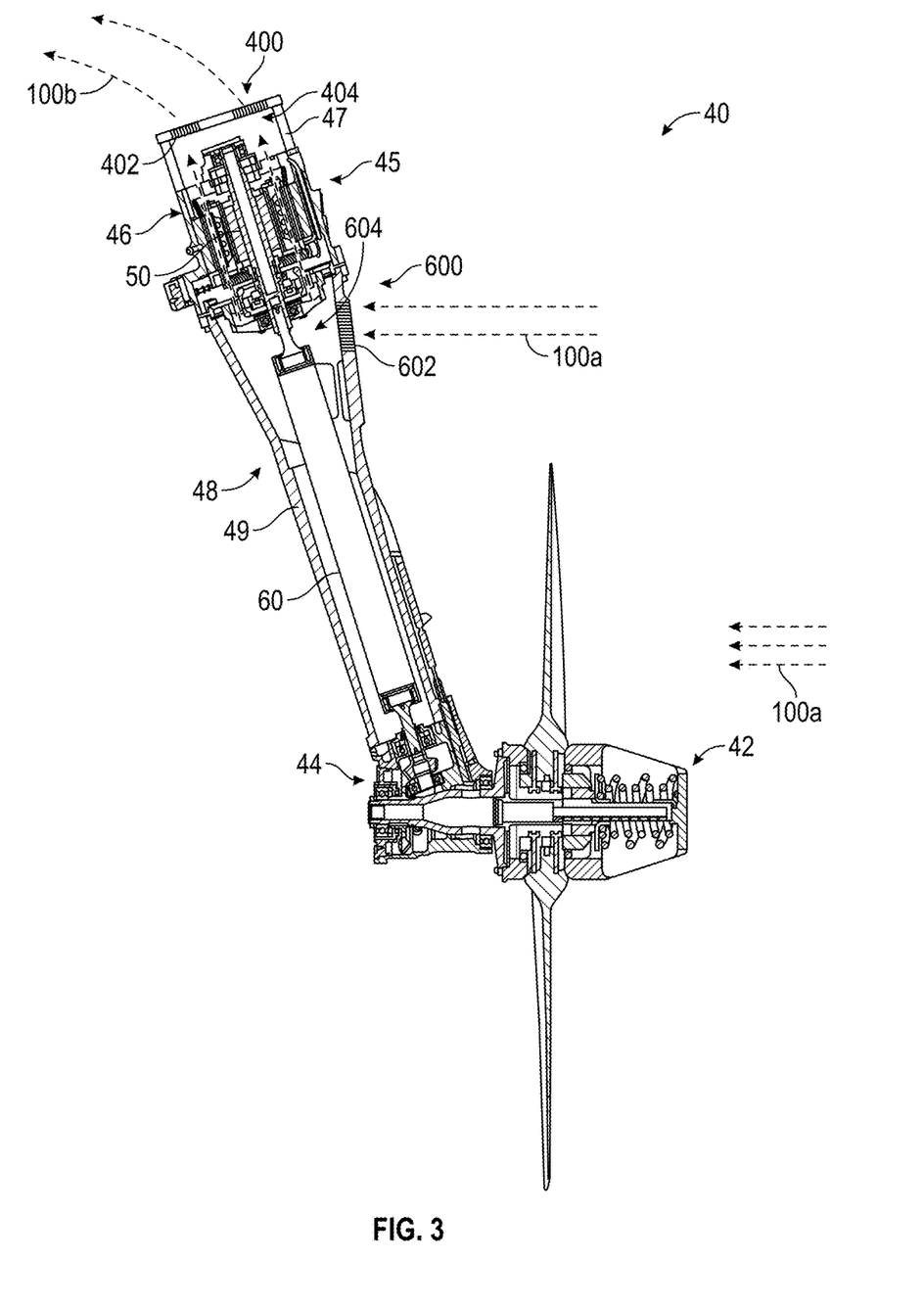
FIG. 3 is a cross-sectional side view of the RAT assembly of FIG. 2, according to an embodiment of the present disclosure.

Referring now to FIGS. 2-3, various embodiments of the present disclosure are illustrated. FIG. 2 shows a perspective view of ram air turbine (RAT) assembly 40, according to an embodiment of the present disclosure. FIG. 3 shows a cross-sectional side view of the RAT assembly 40 of FIG. 2, according to an embodiment of the present disclosure. As shown in FIG. 2, the RAT assembly 40 may include a turbine assembly 42, a gearbox assembly 44, a strut assembly 48, and a generator assembly 45. The generator assembly 45 includes a generator housing 46 having an outer surface 47 enclosing a second inner chamber 404 and a power generation device 50 located within the second inner chamber 404. The power generation device 50 may be an electrical generator, hydraulic pump, or both an electrical generator and a hydraulic pump. As the turbine assembly 42 rotates, the rotational torque is transferred from the turbine assembly 42, through the gearbox assembly 44 to a driveshaft 60 in the strut assembly 48, and then to the power generation device 50.

The strut assembly 48 is operably connected to the generator housing 46 as seen in FIGS. 2 and 3. The strut assembly 48 includes an outer housing 49 enclosing a first inner chamber 604. The first inner chamber 604 is fluidly connected to the second inner chamber 404.

The strut assembly 48 includes a first screen portion 600 having a plurality of inlet holes 602 integrally formed in the outer housing 49. The first screen portion 600 in operation allows the freestream air 100a to enter the outer housing 49 through the plurality of inlet holes 602. After entering the outer housing 49, the freestream air will move from the first inner chamber 604 to the second inner chamber 404 and pass over the power generation device in the second inner chamber 404. The freestream air 100a passing over the power generation device 50 cools the power generation device 50 by removing heat.

The generator housing 46 includes a second screen portion 400 having a plurality of outlet holes 402 integrally formed in the outer surface 47. The second screen portion 400 in operation allows the freestream air 100b to exit the generator housing 46 after it has passed over the power generation device 50.

Figure 4:
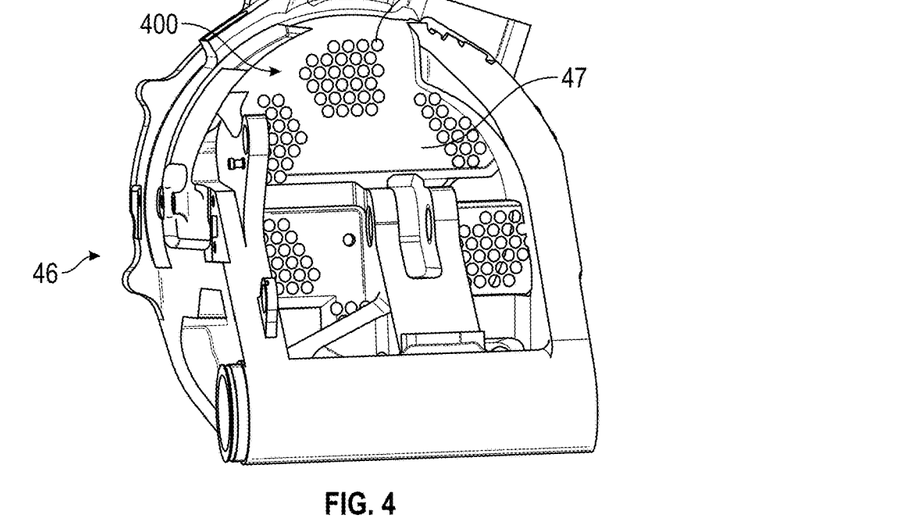
FIG. 4 is a top view of a generator housing of the RAT assembly of FIG. 2, according to an embodiment of the present disclosure.
Figure 5:
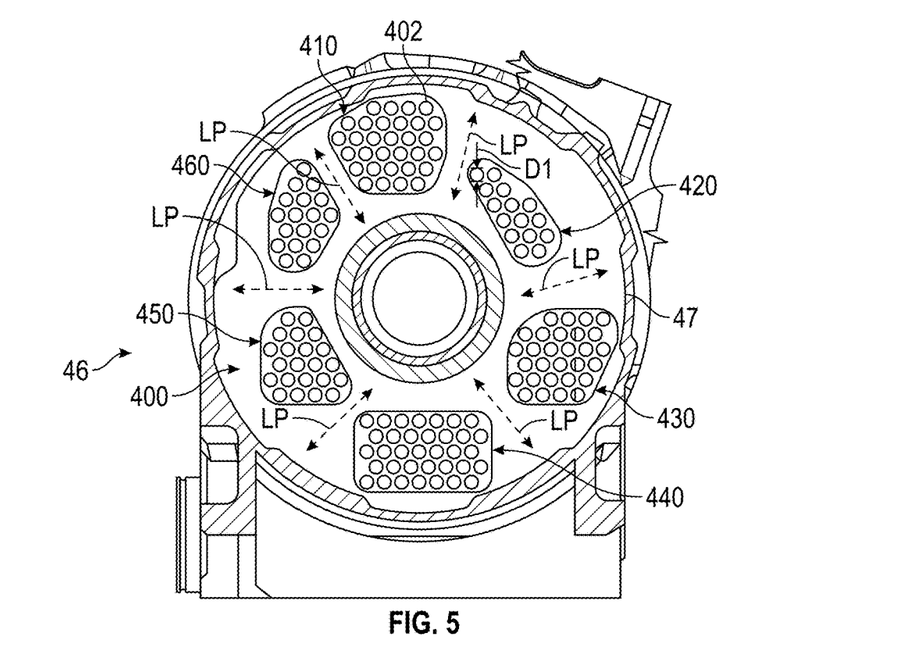
FIG. 5 is a schematic illustration of the generator housing of the RAT assembly of FIG. 2, according to an embodiment of the present disclosure.

Referring now to FIGS. 4-5, various embodiments of the present disclosure are illustrated. FIG. 4 shows a top view of a generator housing 46 of the RAT assembly 40 of FIG. 2, according to an embodiment of the present disclosure. FIG. 5 shows a schematic illustration of a generator housing 46 of the RAT assembly 40 of FIG. 2, according to an embodiment of the present disclosure. In an embodiment, the plurality of outlet holes 402 are oriented in a staggered hole pattern, as seen in FIGS. 4-5. Advantageously, a staggered hole pattern allows for the maximum number of circular holes in a given area, which in turn increases airflow through such holes. Also advantageously, a staggered hole pattern adds structural rigidity in torsion. In an embodiment, there is at least about 0.07 inches (0.178 centimeters) between each of the plurality of outlet holes 402. Also, in an embodiment, the plurality of outlet holes 402 are segmented into six separate groups 410, 420, 430, 440, 450, 460, as seen in FIG. 5. In another embodiment, the groups 410, 420, 430, 440, 450, 460 are separated from each other by structural load paths LP of the generator housing 46. In yet another embodiment, each of the plurality of outlet holes 402 may have a diameter D1 of less than about 0.281 inches (0.714 centimeters). In another embodiment, a ratio of an area of the plurality of outlet holes 402 to an area of the second screen portion 400 is less than about 0.6. The area of the second screen portion 400 sums the area of the six separate groups 410, 420, 430, 440, 450, 460.

Figure 6:
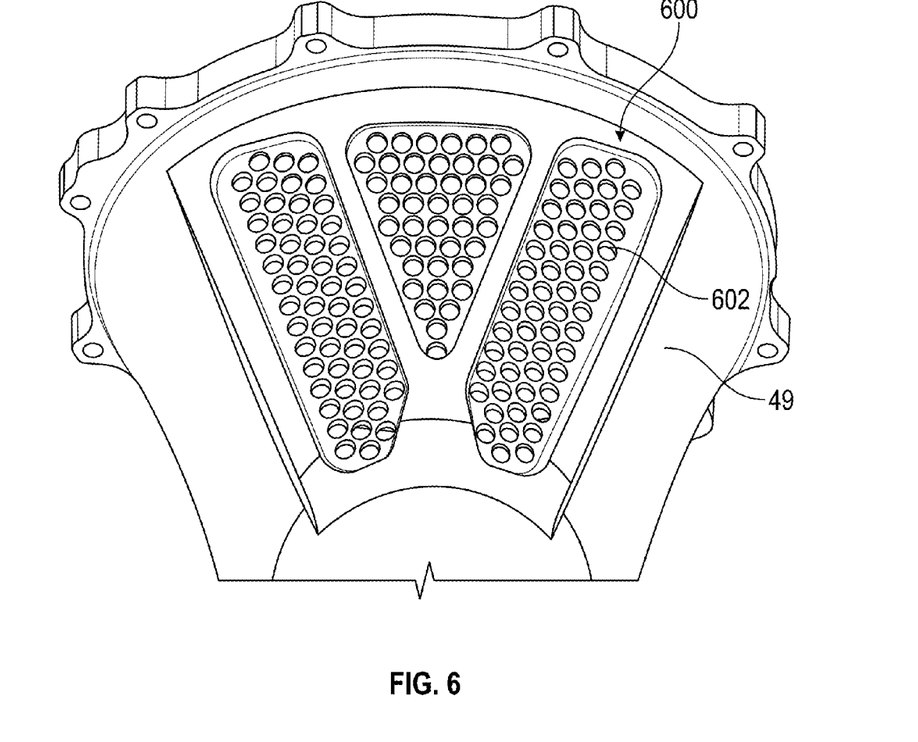
FIG. 6 is a view of a first screen portion of the RAT assembly of FIG. 2, according to an embodiment of the present disclosure.
Figure 7:
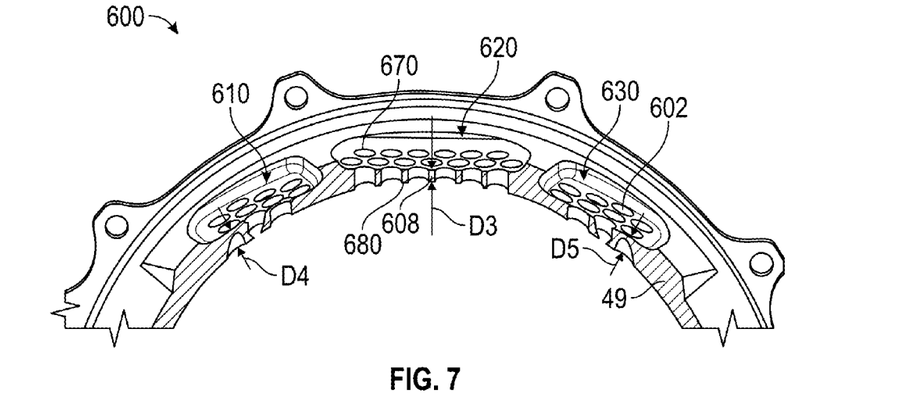
FIG. 7 is a cross-sectional view of the first screen portion of FIG. 6, according to an embodiment of the present disclosure.
Figure 8:
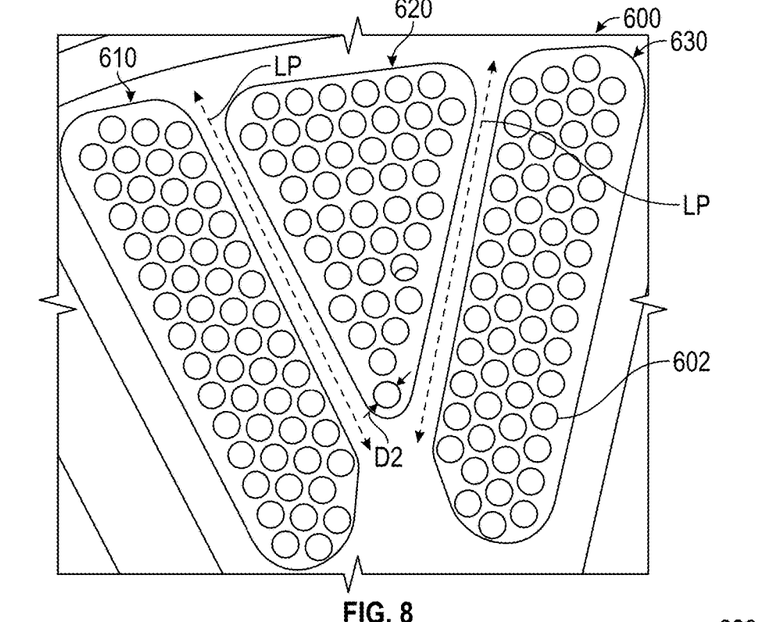
FIG. 8 is a schematic view of a first screen portion of the RAT assembly of FIG. 2, according to an embodiment of the present disclosure.

Referring now to FIGS. 6-8, various embodiments of the present disclosure are illustrated. FIG. 6 shows a view of a first screen portion 600 of the RAT assembly 40 of FIG. 2, according to an embodiment of the present disclosure. FIG. 7 shows a cross-sectional view of the first screen portion 600 of FIG. 6, according to an embodiment of the present disclosure. FIG. 8 shows a schematic view of a first screen portion 600 of the RAT assembly 40 of FIG. 2, according to an embodiment of the present disclosure.

In an embodiment, the plurality of inlet holes 602 are oriented in a staggered hole pattern, as can be seen in FIGS. 5-8. Advantageously, a staggered hole pattern allows for the maximum number of circular holes in a given area, which in turn increases airflow through such holes. In an embodiment, there is at least about 0.07 inches (0.178 centimeters) between each of the plurality of inlet holes 602. In another embodiment, the plurality of inlet holes 602 are segmented into three separate groups 610, 620, 630 as seen in FIGS. 7-8. In another embodiment, the groups 610, 620, 630 are separated from each other by structural load paths LP of the outer housing 49, as seen in FIG. 8. In yet another embodiment, each of the plurality of inlet holes 602 may have a diameter D2 of less than about 0.281 inches (0.714 centimeters). In another embodiment, a ratio of an area of the plurality of inlet holes 602 to an area of the first screen portion 600 is less than about 0.6. The area of the first screen portion 600 sums the area of the three separate groups 610, 620, 630. In an embodiment, the inlet holes 602 are oriented about parallel to the freestream 100a. Advantageously, orienting inlet holes parallel to freestream air allows maximum airflow through the holes.

Further, in an embodiment the outer housing 49 at the first screen portion 600 may have a variable thickness, as seen in FIG. 7. The thickness D3 of the outer housing 49 being thinnest at a center point 608 of the first screen portion 600 and increases in thickness D4, D5 circumferentially outward from the center point 608, as seen in FIG. 7. In an embodiment, the groups 610, 620, 630 may be pockets, as seen in FIG. 7. The pockets 610, 620, 630 may be flat on the outer diameter 670 of the outer housing 49 and conical on the inner diameter 680 of the outer housing 49, as seen in FIG. 7. Advantageously, having a flat outer diameter surface and a conical inner diameter surface helps reduce stress on holes proximate the perimeter of a group of holes because the screen holes near the edges also have the greater wall thickness to reduce stress. Also advantageously, as the ratio of ((length of the inlet hole)/(diameter of the inlet hole)) increases up to a value of one, the airflow through the inlet hole also increases. The length of the inlet hole is the same as the thickness of the first screen portion. Thus, advantageously the thinnest screen portion does not tend increase airflow and thicker screen portions may be used to increase both airflow and structural rigidity.

Further advantageously, integral screens allow heat removal from the power generation device of a RAT, while augmenting the structural rigidity to prevent structural resonance from occurring at a self-induced frequency. Also, advantageously, integral screens provide cost reduction by reducing the need to fabricate and attach separate screens to the RAT assembly.

Figure 9:
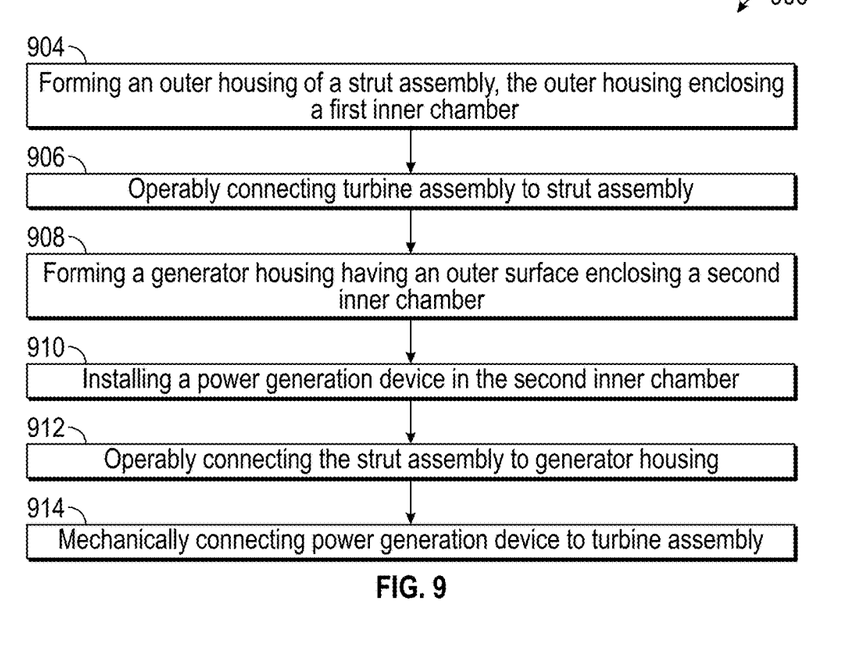
FIG. 9 is a flow process illustrating a method of manufacturing the RAT assembly of FIG. 2, according to an embodiment of the present disclosure.

Referring now to FIG. 9 while referencing components of the RAT assembly 40 FIGS. 2-8. FIG. 9 shows a flow process illustrating a method 900 of manufacturing the RAT assembly 40 of FIG. 2. At block 904, the outer housing 49 of the strut assembly 48 is formed. The outer housing 49 encloses the inner chamber 604, as seen in FIG. 3. The strut assembly 48 also includes the first screen portion 600 having the plurality of inlet holes 602 integrally formed in the outer housing 49, as seen in FIGS. 1, 2, and 6-8. The first screen portion 600 in operation allows the freestream air 100a to enter the outer housing 49 through the plurality of inlet holes 602 and pass over the power generation device 50. The inlet holes 602 may be formed by a variety of methods including but not limited to etching, drilling, machining, high-pressure water and laser. In an embodiment the inlet holes 602 are drilled about parallel to the freestream air 100a. At block 906, a turbine assembly 42 is operably connected to the strut assembly 48. The turbine assembly 42 in operation rotates in freestream air 100a.

At block 908, a generator housing 46 is formed. The generator housing 46 includes the outer surface 47 enclosing the second inner chamber 404, as seen in FIG. 3. The generator housing 46 includes the second screen portion 400 having the plurality of outlet holes 402 integrally formed in the outer surface 47, as seen in FIGS. 2-5. The second screen portion 402 in operation allows the freestream 100b air to exit the generator housing 46 after it has passed over the power generation device 50. The outlet holes 402 may be formed by a variety of methods including but not limited to etching, drilling, machining, high-pressure water and laser.

At block 910, the power generation device 50 is installed into the second inner chamber 404. The power generation device 50 in operation generates power as the turbine assembly 42 rotates. At block 912, the strut assembly 48 is operably connected to the generator housing 46 in such a way that the second inner chamber 404 is fluidly connected to the first inner chamber 604. At block 914, the power generation device 50 is mechanically connected to the turbine assembly 42.

While the above description has described the flow process of FIG. 9 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A ram air turbine comprising:
a strut assembly having an outer housing enclosing a first inner chamber;
a generator housing operatively connected to the strut assembly, the generator housing having an outer surface enclosing a second inner chamber, wherein the second inner chamber is fluidly connected to the first inner chamber;
a turbine assembly operably connected to the strut assembly, the turbine assembly in operation rotates in freestream air; and
a power generation device mechanically connected to the turbine assembly and located within the second inner chamber, the power generation device in operation generates power as the turbine assembly rotates,
wherein the strut assembly includes a first screen portion having a plurality of inlet holes formed in a curved surface of the outer housing of the strut assembly, the first screen portion in operation allows the freestream air to enter the outer housing through the plurality of inlet holes and pass over the power generation device,
wherein each of the plurality of inlet holes are individually formed circular holes, the plurality of inlet holes being oriented in a staggered hole pattern,
wherein the generator housing includes a second screen portion having a plurality of outlet holes formed in the outer surface, the second screen portion in operation allows the freestream air to exit the generator housing after it has passed over the power generation device.

2. The ram air turbine of claim 1, wherein:
each of the plurality of inlet holes has a diameter of less than 0.281 inches (0.714 centimeters).

3. The ram air turbine of claim 1, wherein:
each of the plurality of outlet holes has a diameter of less than 0.281 inches (0.714 centimeters).

4. The ram air turbine of claim 1, wherein:
the plurality of outlet holes are oriented in a staggered hole pattern.

5. The ram air turbine of claim 1, wherein:
the plurality of inlet holes are segmented into three separate groups, the groups being separated from each other by structural load paths of the outer housing.

6. The ram air turbine of claim 1, wherein:
the plurality of outlet holes are segmented into six separate groups, the groups being separated from each other by structural load paths of the generator housing.

7. The ram air turbine of claim 5, wherein:
the outer housing at the first screen portion has a variable thickness, the thickness of the outer housing being thinnest at a center point of the first screen portion and increases in thickness circumferentially outward from the center point.

8. The ram air turbine of claim 5, wherein:
a ratio of an area of the plurality of inlet holes to an area of the first screen portion is less than 0.6.

9. A method of manufacturing a ram air turbine comprising:
forming an outer housing of a strut assembly, the outer housing enclosing a first inner chamber;
operably connecting a turbine assembly to the strut assembly, the turbine assembly in operation rotates in freestream air;
forming a generator housing having an outer surface enclosing a second inner chamber;
installing a power generation device into the second inner chamber, the power generation device in operation generates power as the turbine assembly rotates;
operably connecting the strut assembly to the generator housing, the second inner chamber being fluidly connected to the first inner chamber; and
mechanically connecting the power generation device to the turbine assembly,
wherein the strut assembly includes a first screen portion having a plurality of inlet holes formed in a curved surface of the outer housing of the strut assembly, the first screen portion in operation allows the freestream air to enter the outer housing through the plurality of inlet holes and pass over the power generation device,
wherein each of the plurality of inlet holes are individually formed circular holes, the plurality of inlet holes being oriented in a staggered hole pattern,
wherein the generator housing includes a second screen portion having a plurality of outlet holes formed in the outer surface, the second screen portion in operation allows the freestream air to exit the generator housing after it has passed over the power generation device.

10. The method of claim 9, wherein:
each of the plurality of inlet holes has a diameter of less than 0.281 inches (0.714 centimeters).

11. The method of claim 9, wherein:
each of the plurality of outlet holes has a diameter of less than 0.281 inches (0.714 centimeters).

12. The method of claim 9, wherein:
the plurality of outlet holes are oriented in a staggered hole pattern.

13. The method of claim 9, wherein:
the plurality of inlet holes are segmented into three separate groups, the groups being separated from each other by structural load paths of the outer housing.

14. The method of claim 9, wherein:
the plurality of outlet holes are segmented into six separate groups, the groups being separated from each other by structural load paths of the generator housing.

15. The method of claim 9, wherein:
the outer housing at the first screen portion has a variable thickness, the thickness of the outer housing being thinnest at a center point of the first screen portion and increases in thickness circumferentially outward from the center point.

16. The method of claim 9, wherein:
a ratio of an area of the plurality of inlet holes to an area of the first screen portion is less than 0.6.

17. A method of cooling a power generation device of a ram air turbine, comprising:
allowing freestream air to enter an outer housing of strut assembly through a plurality of inlet holes formed in a curved surface the outer housing of the strut assembly, wherein each of the plurality of inlet holes are individually formed circular holes, the plurality of inlet holes being oriented in a staggered hole pattern;
passing the freestream air over the power generation device within a generator housing, the generator housing being fluidly connected to the outer housing; and
allowing the freestream air to exit the generator housing through a plurality of outlet holes formed in an outer surface of the generator housing.

18. The method of claim 17, wherein:
each of the plurality of inlet holes has a diameter of less than 0.281 inches (0.714 centimeters).

* * * * *